United States Patent [19]

Sung et al.

[11] 3,884,946

[45] May 20, 1975

[54] PROCESS FOR THE PRODUCTION OF ALKYLENE GLYCOL MONOESTERS

[75] Inventors: Eric Sung, Monheim Rhld.; Wilfried Umbach, Langenfeld; Horst Baumann, Leichlingen, all of Germany

[73] Assignee: Henkel & Cie GmbH, Dusseldorf, Germany

[22] Filed: Sept. 24, 1973

[21] Appl. No.: 399,812

Related U.S. Application Data

[63] Continuation-in-part of Ser. No. 141,962, May 10, 1971, abandoned.

[30] Foreign Application Priority Data

May 16, 1970 Germany............................ 2024050

[52] U.S. Cl............... 260/400; 260/410.6
[51] Int. Cl................. C07c 67/00; C07c 143/90
[58] Field of Search................. 260/410.6

[56] References Cited
UNITED STATES PATENTS

| | | | |
|---|---|---|---|
| 2,129,896 | 9/1938 | Whiteman | 260/400 |
| 2,894,009 | 7/1959 | Schmolka | 260/400 |
| 2,910,490 | 10/1959 | Malkemus | 260/410.6 |
| 2,929,835 | 3/1960 | Hayes et al. | 260/486 |
| 3,067,222 | 12/1962 | Anderson | 260/410.6 |
| 3,360,545 | 12/1967 | Wygant | 260/485 |
| 3,509,048 | 4/1970 | Brown | 252/8.7 |
| 3,641,112 | 2/1972 | Ichikawa et al. | 260/475 P |
| 3,824,263 | 7/1974 | Umbach et al. | 260/410.6 |

*Primary Examiner*—Donald G. Daus
*Assistant Examiner*—Diana G. Rivers
*Attorney, Agent, or Firm*—Hammond & Littell

[57] ABSTRACT

Process for the production of alkylene glycol monoesters which consists of reacting carboxylic acids having 8 to 24 carbon atoms selected from the group consisting of alkanoic acids, alkenoic acids and mixtures thereof with an alkylene oxide having 2 to 4 carbon atoms in the presence of a tertiary amine catalyst of the formula

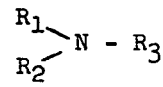

where $R_1$ and $R_2$ are alkyl having 1 to 4 carbon atoms and $R_3$ is alkyl having 8 to 20 carbon atoms, and optionally sulfonating the reaction product without purification.

4 Claims, No Drawings

PROCESS FOR THE PRODUCTION OF ALKYLENE GLYCOL MONOESTERS

REFERENCE TO A PRIOR APPLICATION

This application is a continuation-in-part of our co-pending application Ser. No. 141,962, filed May 10, 1971, now abandoned.

THE PRIOR ART

Sterically hindered carboxylic acids, for example, carboxylic acids which contain alkyl branched chains in the α-position to the carboxyl group, can be reacted with alkylene oxides in the presence of strongly basic catalysts to give mono-esters of alkylene glycols, according to British Pat. No. 1,119,897. On the other hand, it is known that the usual alkoxylations, carried out in the presence of strongly basic catalysts, of carboxylic acids unbranched in the α-position to the carboxyl group are not generally suitable for the preparation of mono-esters of alkylene glycols, since the formation of diesters is thereby favored, both (1) from the alkylene glycol carboxylic acid monoesters and unreacted carboxylic acid and (2) by disproportionation of alkylene glycol carboxylic acid monoesters formed to diesters and alkylene glycol. The U.S. Pat. Nos. 2,929,835 and 3,360,545 disclose how, even with acrylic acid, methacrylic acid and fumaric acid, care must be taken to terminate the reaction at the proper time with a relatively high acid number in the reaction product and to purify the same by distillation of the monoester. It has therefore already been proposed to use different catalysts in the alkoxylation of carboxylic acids. The U.S. Pat. No. 2,910,490 described a process for the preparation of alkylene glycol carboxylic acid monoesters by reacting carboxylic acids with alkylene oxides using ammonium halides as catalysts. In the German Specification (DAS) No. 1,248,660, thioethers are proposed as catalysts for the same purpose. From the Dutch Patent Application No. 66 14 650, the use of sulfoxides, and from the German Specifications (DAS) Nos. 1,154,479 and 1,157,623, the use of aqueous carboxylic acid amides as catalysts for the said reaction is known.

With regard to the use of the alkylene glycol higher fatty acid monoesters as starting substances for the preparation of surface-active substances of the sulfate type in particular, the said catalysts have disadvantages which make their separation necessary. The presence of thioethers and sulfoxides during the alkoxylation lead to products which may possess an unpleasant smell. Apart from this, thioethers and also most sulfoxides are relatively difficult to obtain. Ammonium halides, especially those with relatively long alkyl residues, when mixed with anionic surface-active compounds, form unwanted neutral salts owing to their sparing solubility. Finally, carboxylic acid amides may lead to undesired side reactions during the alkoxylation reaction, since they begin to hydrolyze at elevated temperature.

OBJECTS OF THE INVENTION

An object of the present invention is the development of a process for the production of alkylene glycol monoesters which consists essentially of reaction a carboxylic acid having from 8 to 24 carbon atoms selected from the group consisting of alkanoic acids, alkenoic acids, and mixtures thereof with an alkylene-vic.-oxide having 2 to 4 carbon atoms in substantially the stoichiometric amount based on said carboxylic acid, at a temperature of from 20°C to 200°C in the presence of from 1 to 5% by weight, based on said carboxylic acid, of an aliphatic tertiary amine catalyst, which is in liquid form at the reaction temperature, having the formula

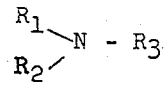

wherein $R_1$ and $R_2$ are alkyl having 1 to 4 carbon atoms and $R_3$ is alkyl having 8 to 20 carbon atoms, and recovering said alkylene glycol monoester in yields of 87% or over.

A further object of the present invention is the development of a process for the production of sulfates of carboxylic acid alkylene glycol monoesters which consists essentially of reacting a carboxylic acid having from 8 to 24 carbon atoms selected from the group consisting of alkanoic acids, alkenoic acids, and mixtures thereof with an alkylene-vic.-oxide having 2 to 4 carbon atoms in substantially the stoichiometric amount based on said carboxylic acid, at a temperature of from 20°C to 200°C in the presence of from 1 to 5% by weight, based on said carboxylic acid, of an aliphatic tertiary amine catalyst which is in liquid form at the reaction temperature, having the formula

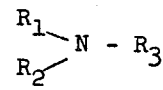

wherein $R_1$ and $R_2$ are alkyl having 1 to 4 carbon atoms and $R_3$ is alkyl having 8 to 20 carbon atoms, reacting the catalyst-containing reaction product with a sulfating agent, and recovering said sulfates of carboxylic acid alkylene glycol monoesters.

These and other objects of the invention will become more apparent as the description thereof proceeds.

DESCRIPTION OF THE INVENTION

It has now been surprisingly found that alkylene glycol monoesters of higher aliphatic carboxylic acids, and especially those carboxylic acids which have no branching in the α-position to the carboxyl group, can be prepared practically free from by-products and generally without the said disadvantages, when amines are used as catalysts for the alkoxylation of carboxylic acids.

The invention therefore relates to a process for the preparation of alkylene glycol monoesters of alkanoic and alkenoic acids containing 8 to 24 carbon atoms by reacting the carboxylic acids with alkylene oxides in the presence of tertiary amines as catalysts.

Useful catalysts are amines of the general formula

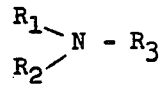

in which $R_1$ and $R_2$ represent alkyl having 1 to 4 carbon atoms, and $R_3$ represents alkyl having 8 to 20 carbon atoms.

Examples of amines utilizable according to the invention include N,N-dimethyl-n-dodecylamine, N,N- dimethyloctadecylamine, N-N-diethyldodecylamine, N,N-dipropylhexadecylamine, N,N-dimethylcocoalkylamine, where cocoalkyl is the mixed alkyls derived by hydrogenation of coconut oil fatty acids, etc. Such amines are essentially liquid at temperatures well above 80°C, and form adducts having a textile-softening action when sulfated.

Applicants have found that lower molecular weight amines, such as mono-, di-, and tri-methylamine, mono-, di- and tri-ethylamine, mono-, di- and tri-n-butylamine, tert.-butylamine, mono-, di- and tri-n-propylamine, di-isopropyl-amine, n-hexylamine, hexamethylenediamine, etc., when used as catalysts give rise to increased production of diesters or alkylene or polyalkylene glycols or both. Even the tertiary amine catalysts of the invention are not as effective as catalysts when lower molecular weight carboxylic acids and dicarboxylic acids are employed in the reaction. Using the process of the invention, however, byproduct formation of diesters and/or alkylene or polyalkylene glycols is well below 2% of the total product.

The amine catalysts described may be added to the reaction mixture in amounts of preferably 1 to 5%, especially 2 to 4% by weight, based on the carboxylic acid to be reacted. After the reaction is carried out, the catalysts may remain in the reaction mixture. The amine-containing reaction products, even after relatively long storage, are still water-white and can be further processed by sulfation without difficulty. The nitrogen-containing substances contained in the alkylene glycol monoesters prepared by the process of the invention impart to the resultant surface-active products additional valuable properties with regard to microbiostatic and partial microbiocidal action, which can make the addition of the usual preservatives to the washing and cleaning compositions containing these substances superfluous. Further, these nitrogen-containing substances produces textile-softening and corrosion-inhibiting properties in the resultant surface-active production of the alkylene glycol monoesters prepared according to the invention.

The process according to the invention is applicable to alkanoic acids, alkenoic acids and mixtures thereof which are preferably straight-chain and have 8 to 24 carbon atoms. Examples of the starting substances include: fatty acids and/or fatty acid mixtures containing 8 to 24 carbon atoms such as may be obtained from the natural fats and oils by saponification, carboxylic acids and carboxylic acid mixtures obtained by oxidation of hydrocarbons, or the carboxylic acid mixtures prepared by known processes by carbonylation of olefin- or acetylene-hydrocarbons.

The alkylene oxides for the reaction in the process according to the invention are preferably the possibly substituted vicinal epoxides containing 2 to 4 carbon atoms such as alkylene oxides, haloalkylene oxides and hydroxyalkylene oxides, for example ethylene oxide, propylene oxide, butylene oxide, epichlorhydrin and/or glycide.

The alkylene oxides are used in approximately stoichiometric amounts, i.e. one mol of epoxide is used per mol of carboxylic acid. A very small excess of epoxide may be of advantage.

The reaction of the carboxylic acids with the epoxides may be carried out under the conditions customary for alkoxylation processes. Suitable temperatures are therefore between 20° and 200°C, preferably between 50° and 100°C; the reaction may be effected both at normal pressure and at increased pressure.

The use of a solvent in the reaction is generally unnecessary. In some cases, for example in the reaction of high-melting carboxylic acids, however, the use of a solvent usual for alkoxylation reactions, for example diethyleneglycoldimethyl ether or dioxan, may be advantageous.

To carry out the reaction, the carboxylic acid or possibly the carboxylic acid/solvent mixture is mixed with the required amount of catalyst, the mixture is heated to the desired reaction temperature and, after driving out the air from the reaction vessel, the calculated amount of alkylene oxide is added in liquid or gaseous form. The presence of small amounts of water, which may be present in the starting substances or the catalyst, does not adversely affect the reaction on operating in the preferred temperature range; it is not therefore necessary to dry the said substances.

The reaction products obtained are water-white and have monoester contents of 87% and over. Contents of as high as 98–99% are readily obtained. The remainder subtracted from 100% consists of some unreacted carboxylic acid. Polyglycol and diester are practically absent from the products. Owing to the high monoester content and to the fact that the amines used as catalysts may remain in the reaction mixture, working up of the products is generally unnecessary.

The fact that, according to the process of the invention products may be obtained which consist practically completely of alkylene glycol monoesters is all the more surprising, since it is known from the literature that amines are like alkali metal hydroxides, which are not suitable as catalysts, since they lead first to a product consisting of a mixture of monoesters, diesters and unreacted carboxylic acid, which first has to be separated by distillation, and on the other hand, all basic catalysts favor a polymerization of the epoxide with the formation of polyglycols. Therefore, a considerable prejudice is needed to be surmounted in order to develop the process according to the invention.

The sulfation of the crude alkoxylation mixture obtained above is conducted with at least a molecular equivalent of a sulfating agent stronger than concentrated sulfuric acid at temperatures of from 0°C to 50°C.

By "strong sulfating agents" are meant those which are stronger than concentrated sulfuric acid, for example, $SO_3$ or $SO_3$/air mixtures, oleum, chlorosulfonic acid, and the like. The addition of adduct formers for the sulfating agent or the presence of solvents are not required in the process. The preferred sulfating agent is chlorosulfonic acid. The mol ratio between the alkoxylate and the sulfating agent is advantageously chosen in the range of from 1:1.0 to 1:1.2, particularly in the range of from 1:1.02 to 1:1.1.

The sulfation reaction can be carried out continuously or discontinuously. The reaction times lie between fractions of seconds to about 20 minutes, depending upon the sulfating agent and/or sulfating apparatus used. Particularly short reaction times are attained if the reaction is carried out with very strong sulfating agents, such as $SO_3$/air mixtures, in modern short-time sulfation reactors which operate by the splitring or falling film principle.

The following examples are illustrative of the invention without being limitative in any manner.

EXAMPLES

The data on the composition of the products indicated in the following examples have been found by the method of analysis given by Maldemus and Swan in "The Journal of the American Oil Chemists Society", 1957, 34, p. 342 and following. In the data for the composition of the products, the content of catalyst was eliminated by calculation.

EXAMPLE 1

100 gm (0.5 mol) of lauric acid and 3.7 gm (3% by weight) of dimethyldodecylamine, based on end product, were placed in an autoclave of 0.4 liter capacity. The air in the autoclave was driven out by scavenging with nitrogen. When the contents of the autoclave had been heated to 80°C, 22 gm (0.5 mol) of ethylene oxide was passed in from a stock vessel at pressures between 0.7 and 6 atm with the aid of nitrogen. During the reaction the temperature was maintained between 80° and 83°C. The entire quantity of ethylene oxide was absorbed in the course of 5 hours. The water-white product consisted of 98.5% by weight of monoester, 0.3% by weight of diester and 1.2% by weight of unreacted lauric acid. Polyethylene glycol was not present.

EXAMPLES 2 to 12

The experiments on which the Examples collected in the following Table I were based, were carried out analogously to Example 1. 0.5 mol of carboxylic acid was used in each case. Examples 8 to 11 are comparative examples showing how the yield of byproducts increases with the use of lower molecular weight amine catalysts and Example 12 is a comparative example showing how the yield of byproducts increases with the use of a dicarboxylic acid.

EXAMPLE 13

The crude alkoxylation products obtained were charged in amounts of 1.5 mols each time into a 3-neck 1.5 liter flask, provided with a stirrer, a gas-inlet tube reaching to the flask bottom, a dropping funnel, and a thermometer. 1.5 to 1.65 mols of chlorosulfonic acid were added under strong agitation, at temperatures between 10°C and 30°C, over a period of about 10 minutes, while simultaneously passing through a slight nitrogen stream for the removal of the evolving hydrogen chloride. After the addition of the chlorosulfonic acid was completed, the agitation was continued for another 5 minutes with nitrogen passing through. Subsequently, the liquid reaction mixture was added to an aqueous sodium hydroxide solution in excess for neutralization. The sulfated products obtained were, in the form of 30% aqueous preparations, viscous, clear pastes.

In addition to the possibility of obtaining alkylene glycol monoesters of carboxylic acids in high yields, the advantages attainable with the invention consist above all in that a separation of the catalyst and consequently in most cases a working up of the reaction mixture can be omitted. Further advantages are that the catalysts are readily available and have not to be prepared by relatively expensive measures, as well as that the catalysts remaining in the product provide this with additional valuable properties, as for example, a corrosion-inhibiting and microbiostatic or microbiocidal action. When the crude products are further treated to give surface-active raw materials by sulfating, the catalyst residues remain completely. In this application, the textile softening action of the catalyst residues contained is additionally to be taken into consideration. A further positive effect is that, with the subsequent sulfation, the catalyst remaining in the product, owing to formation

TABLE I

| Example No. | Carboxylic acid | Catalyst (% wt. in the end product) | Reaction conditions | | | Alkylene oxide added (mol) | Composition of the product | | | |
|---|---|---|---|---|---|---|---|---|---|---|
| | | | Temp. (°C) | Pressure (atm) | Time (h) | | % Acid | % Mono-ester | % Di-ester | % Alkylene or poly-alkylene glycol |
| 1 | Lauric acid | 3% dimethyl-dodecylamine | 80–83 | 0.7–6 | 5 | 1.0 EO | 1.2 | 98.5 | 0.3 | 0 |
| 2 | Lauric acid | 3% dimethyl-dodecylamine | 80–83 | 0.7–8.8 | 5.5 | 0.9 PO | 6.7 | 93.1 | 0 | 0.2 |
| 3 | Lauric acid | 3% dimethyl-dodecylamine + 3% H$_2$O | 80–83 | 0.9–9.0 | 4.5 | 1.0 PO | 6.4 | 93.6 | 0 | 0 |
| 4 | Myristic acid | 3% dimethyl-octadecylamine | 80–82 | 0.6–9.0 | 6.5 | 1 EO | 0.3 | 98.6 | 1.1 | 0 |
| 5 | Lauric acid | 3% dimethyl-dodecylamine | 80–83 | 0.6–8.2 | 6.5 | 1 BuO | 10 | 89.3 | 0 | 0.7 |
| 6 | Oleic acid | 3% dimethyl-octadecyl-amine | 79–81 | 1.0–9.0 | 5.5 | 1 EO | 5.4 | 94.6 | 0 | 0 |
| 7 | Lauric acid | 2% dimethyl-dodecylamine | 75–82 | 0.5–9.4 | 5 | 1 EO | 5.6 | 93.9 | 0.5 | 0 |
| 8 | Lauric acid | 3% n-hexyl-amine | 80–82 | 0.8–8.0 | 7 | 1 EO | 6.9 | 89.8 | 0 | 3.3 |
| 9 | Lauric acid | 3% dibutyl-amine | 77–80 | 0.6–8.0 | 6.5 | 1 EO | 0.3 | 96.8 | 2.2 | 0.7 |
| 10 | Lauric acid | 3% tetraeth-ylenepent-amine | 75–80 | 0.6–8.6 | 5 | 1 EO | 8.7 | 88.0 | 0 | 3.3 |
| 11 | Stearic acid | 3% hexameth-ylenediamine | 80–88 | 0.8–7.0 | 6.5 | 1 EO | 3.5 | 94.2 | 2.3 | 0 |
| 12 | Glutaric acid | 3% dimethyl-dodecylamine | 80–90 | 0.5–9.5 | 6 | 2 EO | 1.0 | 89.0 (x) | 9.0 (x) | 1.0 |

EO = ethylene oxide
PO = 1,2-propylene oxide
BuO = 1,2-butylene oxide
(x) Monoester
    Diester    based on glycol (analysis by NMR)

of adducts with the sulfation means, causes the reaction to proceed more classically which leads to a product of improved quality.

The preceding specific embodiments are illustrative of the practice of the invention. It is to be understood, however, that other expedients known to those skilled in the art may be employed without departing from the spirit of the invention or the scope of the appended claims.

We claim:

1. A process for the production of alkylene glycol monoesters which consists essentially of reacting a carboxylic acid having from 8 to 24 carbon atoms selected from the group consisting of alkanoic acids, alkenoic acids, and mixtures thereof with an alkylene-vic.-oxide having 2 to 4 carbon atoms in substantially the stoichiometric amount based on said carboxylic acid, at a temperature of from 20°C to 200°C in the presence of from 1 to 5% by weight, based on said carboxylic acid, of an aliphatic tertiary amine catalyst which is in liquid form at the reaction temperature having the formula

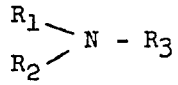

wherein $R_1$ and $R_2$ are alkyl having 1 to 4 carbon atoms and $R_3$ is alkyl having 8 to 20 carbon atoms, and recovering said alkylene glycol monoester in yields of 87% or over.

2. The process of claim 1 wherein said carboxylic acid is fatty acids as derived from natural fats and oils.

3. The process of claim 1 wherein said aliphatic tertiary amine catalyst is selected from the group consisting of N,N-dimethyldodecylamine and N,N-dimethyloctadecylamine.

4. A process for the production of sulfates of carboxylic acid alkylene glycol monoesters which consists essentially of reacting a carboxylic acid having from 8 to 24 carbon atoms selected from the group consisting of alkanoic acids, alkenoic acids, and mixtures thereof, with an alkylene-vic.-oxide having 2 to 4 carbon atoms in substantially the stoichiometric amount based on said carboxylic acid, at a temperature of from 20°C to 200°C in the presence of from 1 to 5% by weight, based on said carboxylic acid, of an aliphatic tertiary amine catalyst which is in liquid form at the reaction temperature, having the formula

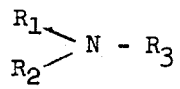

wherein $R_1$ and $R_2$ are alkyl having 1 to 4 carbon atoms and $R_3$ is alkyl having 8 to 20 carbon atoms, reacting the catalyst-containing reaction product with a sulfating agent, and recovering said sulfates of carboxylic acid alkylene glycol monoesters.

* * * * *